(No Model.)
M. H. WEBBER.
MECHANICAL MOVEMENT.
No. 279,058. Patented June 5, 1883.
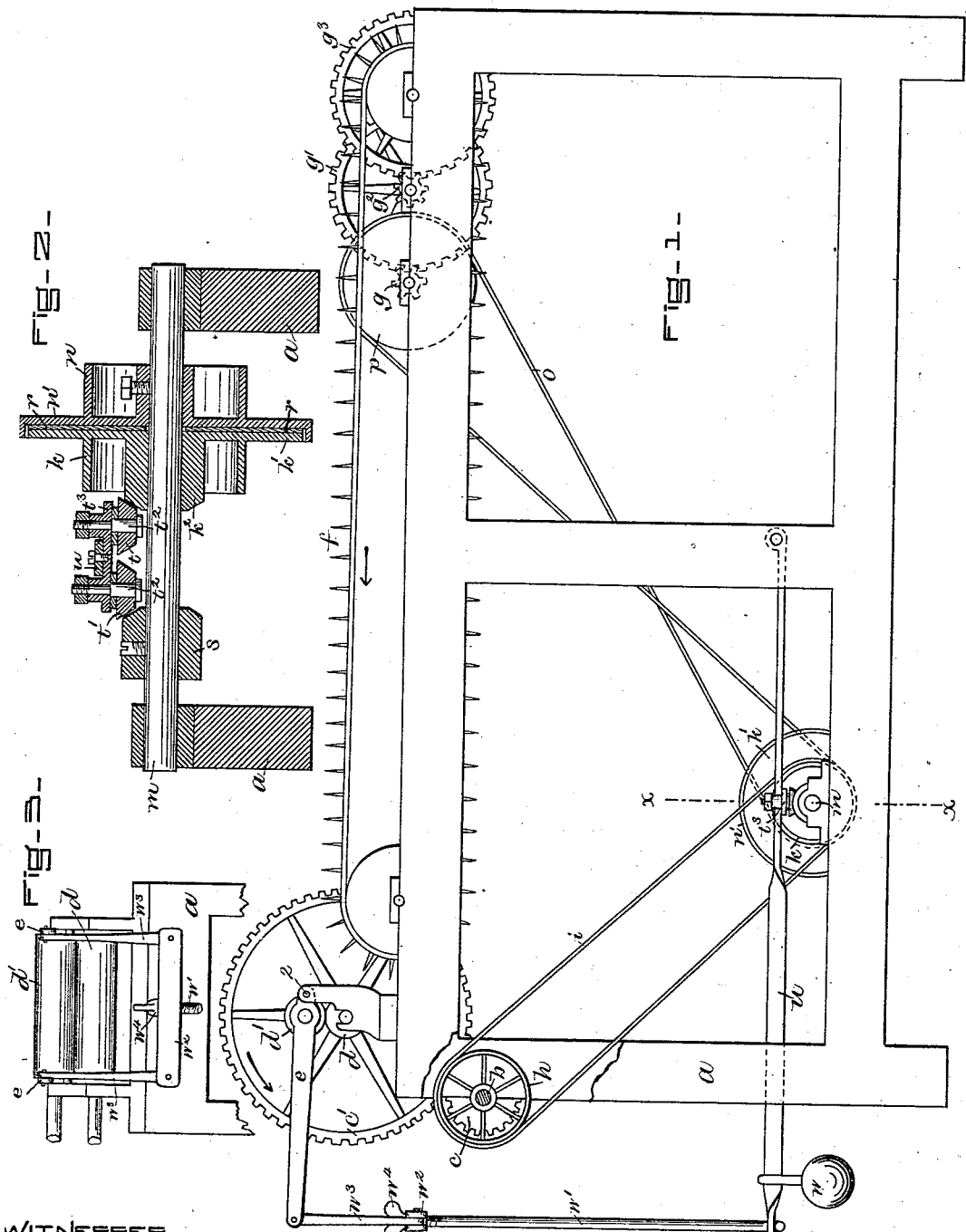
WITNESSES
A. O. Orne,
Fred A. Powell.
INVENTOR
Moses H. Webber
by Crosby & Gregory
Attys.

UNITED STATES PATENT OFFICE.

MOSES H. WEBBER, OF BOSTON, MASSACHUSETTS.

MECHANICAL MOVEMENT.

SPECIFICATION forming part of Letters Patent No. 279,058, dated June 5, 1883.

Application filed April 23, 1883. (No model.)

*To all whom it may concern:*

Be it known that I, MOSES H. WEBBER, of Boston, county of Suffolk, State of Massachusetts, have invented an Improvement in Mechanical Movements, of which the following description, in connection with the accompanying drawings, is a specification, like letters on the drawings representing like parts.

My invention relates to a mechanical movement, and is shown in this instance as employed in a feed-regulator for spinning-machines; and it consists, essentially, in the combination, with a shaft, of pulleys fast and loose thereon, provided with co-operating friction-surfaces, and means to force the friction-surfaces together with a graduated pressure, whereby the rotary movement is transmitted from one to the other of the said pulleys with greater or less power, as may be desired. The said shaft has fixed on it a tapering or conical collar, and the hub of the loose pulley has a corresponding tapering or conical surface, and the pressure between the friction-surfaces is produced by a pair of conical anti-friction rollers adapted to be forced or wedged in between the said collar and hub to separate them a greater or less distance, and thereby press the friction-surfaces more or less forcibly together. The said pulleys, with their friction-surfaces, constitute a friction-clutch, and the conical anti-friction rollers, with their carrying-lever, by which they are moved toward and from the conical collar and hub, constitute the shipper, and in this instance of my invention the said clutch is shown as employed for transmitting the power from the main shaft of the drawing-rolls to the actuating-shaft of the gill-chain or feeding mechanism of a spinning-machine, and the said shipper is actuated by the movement of one of the said drawing-rollers toward and from the other, produced by variation in the thickness of the mass of fiber passing between them.

Figure 1 is a side elevation of a machine for feeding fiber to be spun, provided with a regulator embodying this invention; Fig. 2, a longitudinal section on line $x\ x$, Fig. 1, of the clutch or pulley shaft and pulleys on a larger scale; and Fig. 3, a detail showing the drawing-rollers in front elevation.

The frame-work $a$ sustains the main shaft $b$, driven by a suitable belt, and, through gearing $c\ c'$, actuates the drawing-rollers $d\ d'$, the latter of which has its bearings in levers $e$, pivoted at 2, thus permitting the rollers to be more or less separated in accordance with the thickness of the material passing between them in the usual manner. The said material, fed forward by the gill-chain or hackle-belt $f$, is drawn therefrom, but through a suitable trumpet, (not shown,) by the rollers $d\ d'$, from which latter it passes to a flier or twisting apparatus, as usual. The gill-chain or hackle-belt $f$ is actuated by gearing $g\ g'\ g^2\ g^3$, the said gearing being driven with a variable regulated speed from the main shaft $a$ by the following mechanism: The said main shaft $a$ is provided with a pulley, $h$, connected by a belt, $i$, with a pulley, $k$, loose upon an intermediate shaft, $m$, and provided with a friction surface or disk, $k'$, the hub $k^2$ of the said pulley having a conical surface, as shown. The shaft $m$ has fixed upon it a pulley, $n$, connected by a belt, $o$, with the driving-pulley $p$ of the actuating-gearing of the chain $f$, the said pulley $n$ having a friction surface or disk, $n'$, co-operating with that of the loose pulley $k$, a washer, $r$, being preferably interposed between them, as shown. The shaft $m$ also has fixed upon it a collar, $s$, having a conical surface opposite to and corresponding with the conical surface of the hub $k^2$ of the loose pulley $k$. The said loose pulley is moved longitudinally on the shaft $m$, to press the friction-surfaces together, by the conical anti-friction rollers $t\ t'$, mounted to rotate freely upon studs $t^2$, fixed upon a plate, $t^3$, connected with a lever, $u$, provided with a weight, $n$, and connected by a rod, $w'$, with a cross-bar, $w^2$, connected by links $w^3$ with the levers $e$, forming the bearings for either end of the roller $d'$. Thus, when the said levers are depressed, as by a scarcity of fibrous material between the rollers $d\ d'$, the conical rollers $t\ t'$ will be wedged between the cones $k'\ s$, thus pressing the friction-surfaces together, so that the shaft $m$ and pulley $n$ will be driven almost or quite in unison with the pulley $k$, and the chain $f$ be actuated with maximum speed to feed the material rapidly to the rollers $d\ d'$, and when too great an amount of material is thus fed it will, in passing between the said rollers, raise the one $d'$, thus raising the conical rollers $t\ t'$, and permitting the friction-surfaces to be pressed together more lightly, thus permitting them to stop and the shaft $m$ to lag behind the pulley $k$, or to wholly cease rotating, thus reducing or completely checking the feed until the material between the chain $f$ and rollers is sufficiently drawn down. The length of the connection between the levers $e$ and $n$ is made adjustable by a nut, $w^4$, upon the threaded end of the rod $w'$, thus determining the normal feed of the apparatus.

It is obvious that the herein-described friction-clutch may be employed wherever it is desirable to transmit a regulated amount of power or speed of movement.

I claim—

1. The pulleys and their co-operating friction-surfaces, combined with means, substantially as described, for forcing them together with a regulated pressure, as and for the purpose set forth.

2. The shaft and fast and loose pulleys thereon, the latter provided with a conical hub, combined with the conical collar and conical anti-friction rollers, and means to press them between the said collar and hub, substantially as and for the purpose set forth.

3. The shaft and fast and loose pulleys thereon, provided with friction-surfaces constituting a clutch, and mechanism to actuate one of the said pulleys, and mechanism actuated by the other, combined with the conical anti-friction rollers and their carrying-lever, constituting a shipper, and means to control the said shipper, whereby the relative speed of the actuating and actuated mechanism may be varied, substantially as described.

In testimony whereof I have signed my name to this specification in the presence of two subscribing witnesses.

MOSES H. WEBBER.

Witnesses:
G. W. GREGORY,
W. H. SIGSTON.